United States Patent [19]
Ikezaki

[11] Patent Number: 5,214,644
[45] Date of Patent: May 25, 1993

[54] ELECTRONIC DEVICE WITH DATA TRANSMISSION FUNCTION

[75] Inventor: Masao Ikezaki, Neyagawa, Japan

[73] Assignee: Matsushita Electric Industrial Co., Ltd., Osaka, Japan

[21] Appl. No.: 908,901

[22] Filed: Jul. 2, 1992

Related U.S. Application Data

[63] Continuation of Ser. No. 597,663, Oct. 17, 1990, abandoned.

[30] Foreign Application Priority Data

Oct. 17, 1989 [JP] Japan .................................. 1-269344

[51] Int. Cl.[5] .......................... H04J 3/00; G06F 13/14; G06F 13/38
[52] U.S. Cl. ................................... 370/85.1; 395/325; 395/425
[58] Field of Search .................... 370/85.1, 94.1, 85.4, 370/92; 395/325, 425

[56] References Cited

U.S. PATENT DOCUMENTS

| | | | |
|---|---|---|---|
| 4,467,421 | 8/1984 | White | 395/425 |
| 4,771,391 | 9/1988 | Blasbalg | 370/85.2 |
| 4,858,112 | 8/1989 | Puerzer et al. | 370/85.1 |
| 4,887,075 | 12/1989 | Hirasawa | 370/85.1 |
| 4,979,096 | 12/1990 | Ueda et al. | 395/325 |
| 4,998,245 | 3/1991 | Tanaka et al. | 370/85.1 |
| 5,111,452 | 5/1992 | Kyuma | 370/85.1 |

*Primary Examiner*—Douglas W. Olms
*Assistant Examiner*—Min Jung
*Attorney, Agent, or Firm*—Wenderoth, Lind & Ponack

[57] ABSTRACT

An electronic device for transmitting data to an audio visual device in a domestic data communications network system includes a communications arrangement for transferring a memory access designating frame having an access type and a memory storing address stored in a data field thereof precedent to a read data requiring frame or a write data transferring frame. The communications arrangement has a device controlling part, a data transmission processing part and a communications unit for accomplishing easy realization of processing and transmission of a frame format and data common to the master and slave device.

6 Claims, 18 Drawing Sheets

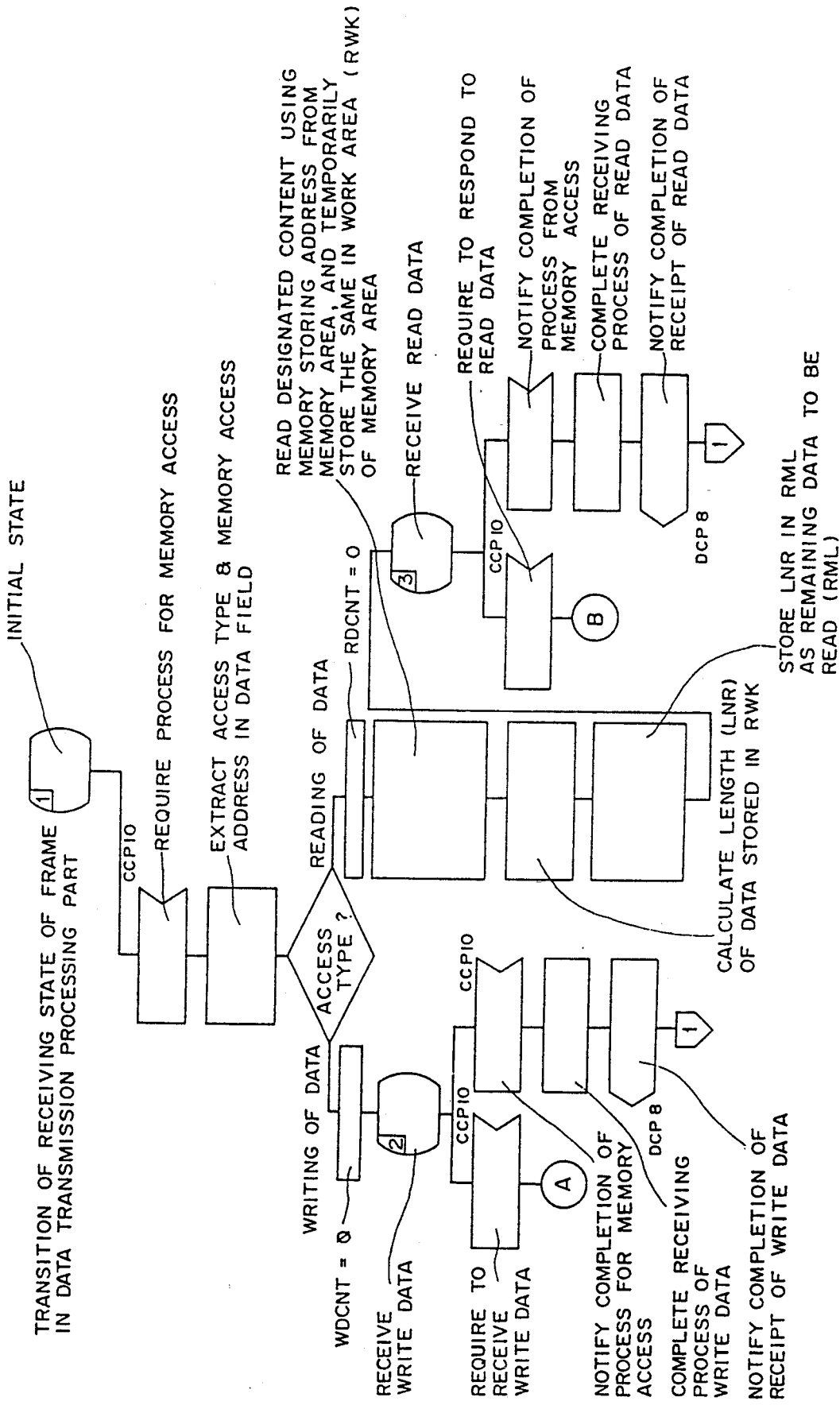

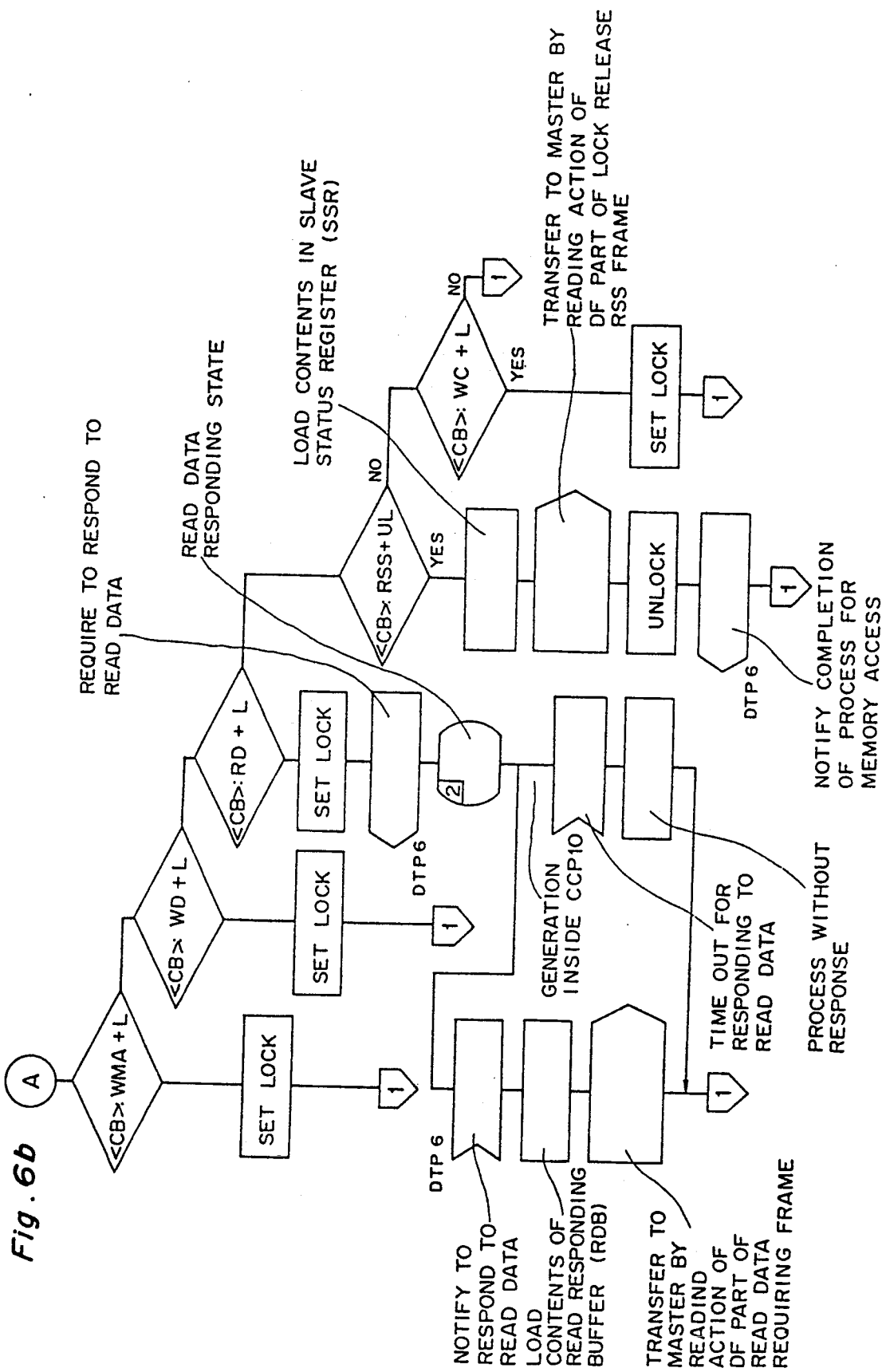

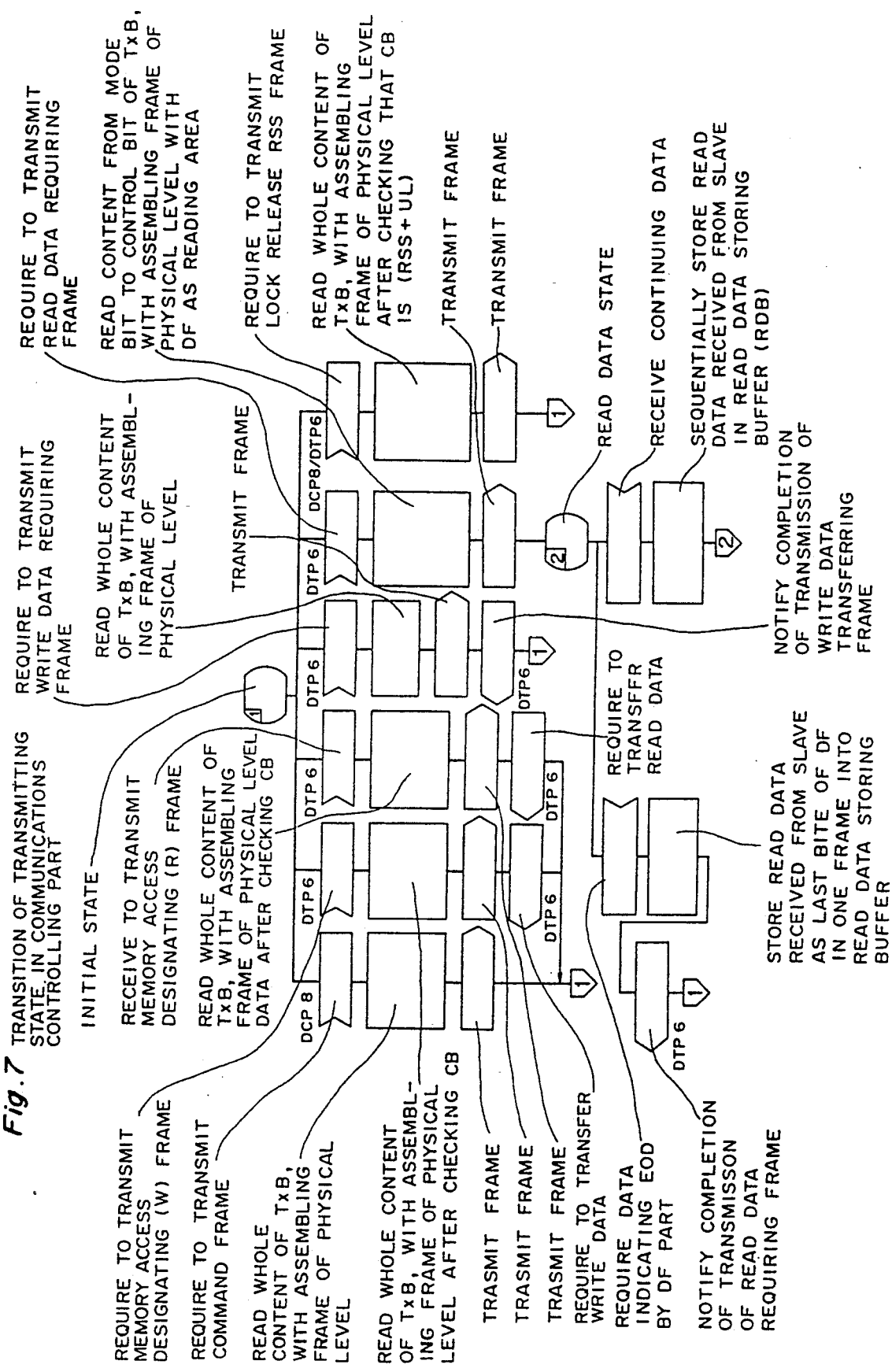
Fig. 7 TRANSITION OF TRANSMITTING STATE IN COMMUNICATIONS CONTROLLING PART

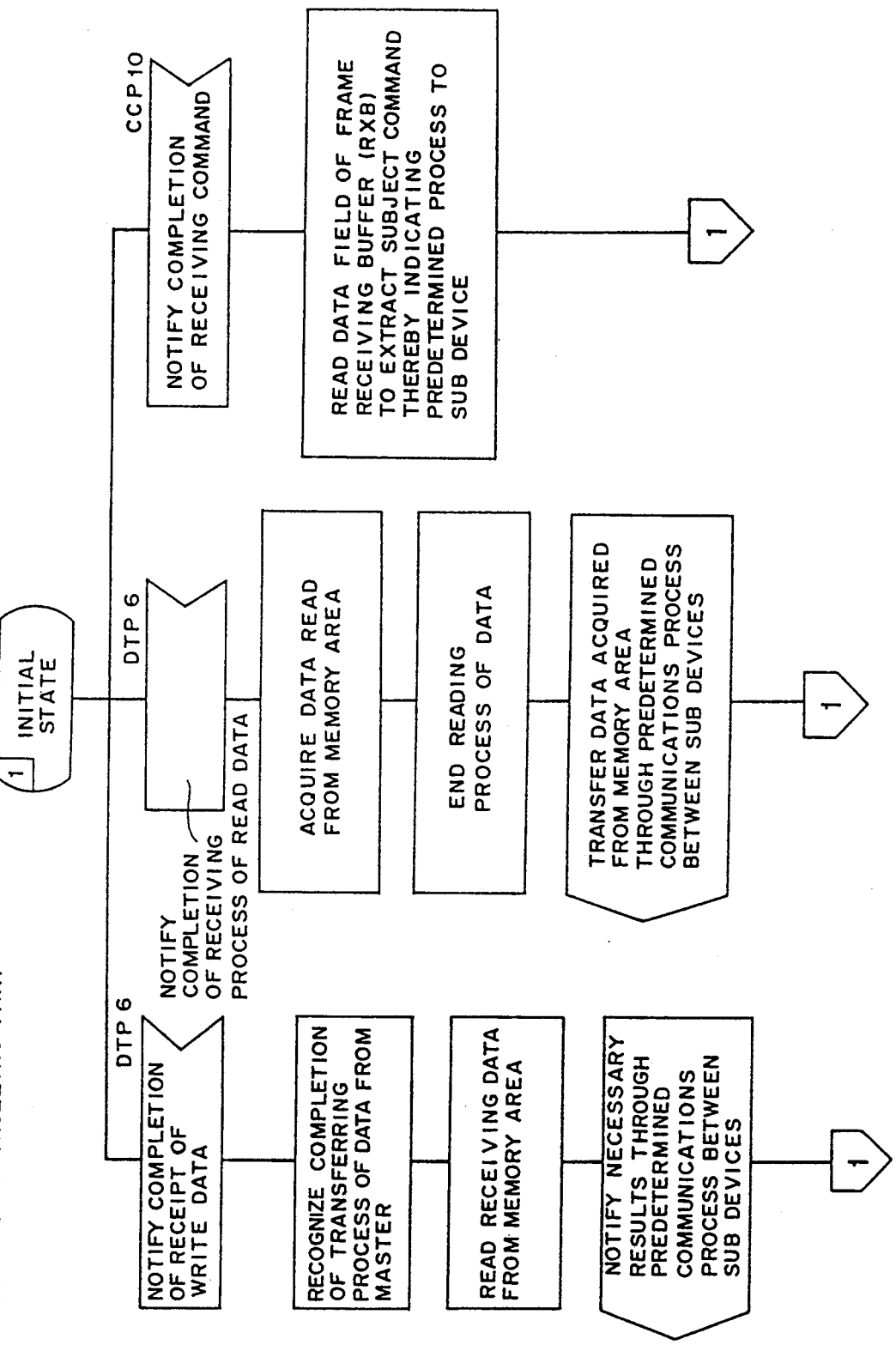

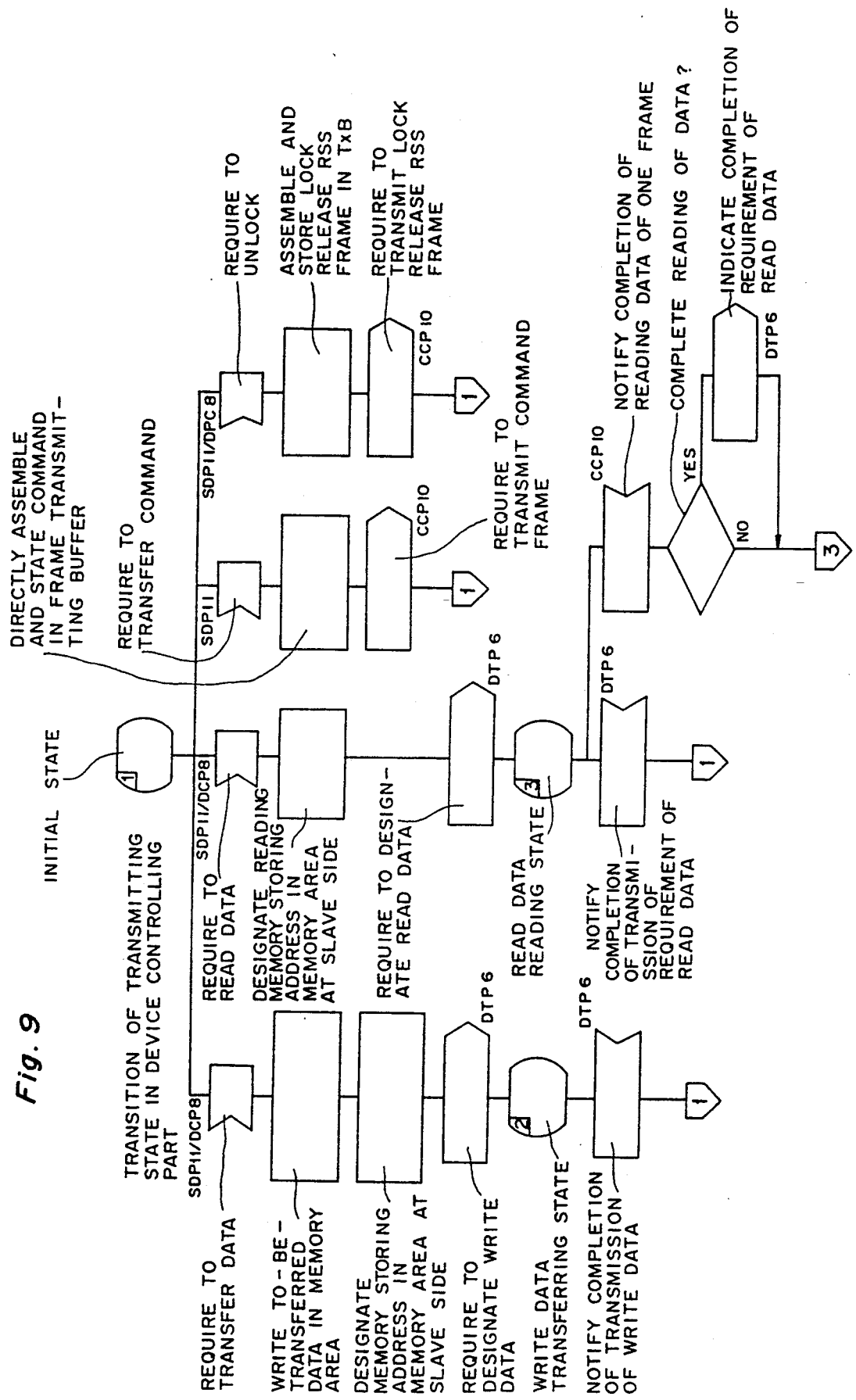

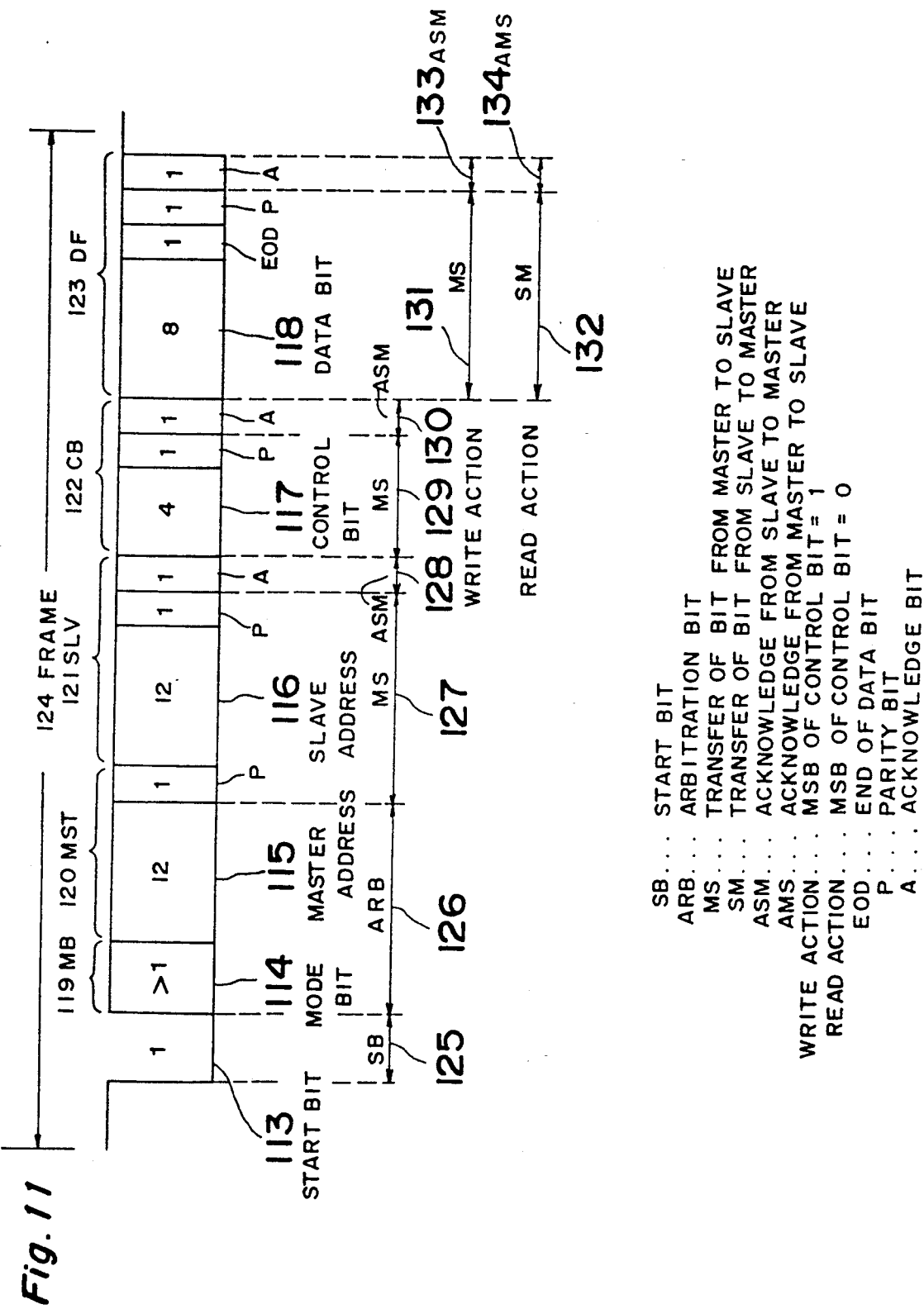

Fig. 12

```
RSS       --- Read Slave Status
RSS+L     --- Read Slave Status + Lock
RD+L      --- Read Data + Lock
RSS+UL    --- Read Slave Status + Unlock
RD+UL     --- Read Data + Unlock
WMA       --- Write Memory Address
WC+L      --- Write Command + Lock
WD+L      --- Write Data + Lock
WC+UL     --- Write Command + Unlock
WD+UL     --- Write Data + Unlock
RLA(M,L)+NL --- Read Lock Address
              (Mid and Least significant nibble)
RLA(H)+NL --- Read Lock Address
              (Most Highest nibble)
```

| b3 | b2 | b1 | b0 | DIRECTION OF DF | CONTENT OF OPERATION | LOCK | ABBREVIATION |
|---|---|---|---|---|---|---|---|
| 0 | 0 | 0 | 0 | FROM SLAVE TO MASTER | READ SLAVE STATUS | NOT LOCK | RSS |
| 0 | 0 | 0 | 1 | | RESERVE | RESERVE | RESERVE |
| 0 | 0 | 1 | 0 | | READ SLAVE STATUS | LOCK | RSS+L |
| 0 | 0 | 1 | 1 | | READ DATA | LOCK | RD+L |
| 0 | 1 | 0 | 0 | | READ LOCK ADDRESS NIBBLE (M.L NIBBLE) | NOT LOCK | RLA(ML)+NL |
| 0 | 1 | 0 | 1 | | READ LOCK ADDRESS NIBBLE (H NIBBLE) | NOT LOCK | RLA(H)+NL |
| 0 | 1 | 1 | 0 | | READ SLAVE STATUS | UNLOCK | RSS+UL |
| 0 | 1 | 1 | 1 | | READ DATA | UNLOCK | RD+UL |
| 1 | 0 | 0 | 0 | FROM MASTER TO SLAVE | WRITE MEMORY ADDRESS | LOCK | WMA+L |
| 1 | 0 | 0 | 1 | | RESERVE | RESERVE | RESERVE |
| 1 | 0 | 1 | 0 | | WRITE COMMAND | LOCK | WC+L |
| 1 | 0 | 1 | 1 | | WRITE DATA | LOCK | WD+L |
| 1 | 1 | 0 | 0 | | RESERVE | RESERVE | RESERVE |
| 1 | 1 | 0 | 1 | | RESERVE | RESERVE | RESERVE |
| 1 | 1 | 1 | 0 | | WRITE COMMAND | UNLOCK | WC+UL |
| 1 | 1 | 1 | 1 | | WRITE DATA | UNLOCK | WD+UL |

ELECTRONIC DEVICE WITH DATA TRANSMISSION FUNCTION

This application is a continuation of now abandoned application Ser. No. 07/597,663 filed on Oct. 17, 1990.

BACKGROUND OF THE INVENTION

1. Field of the Invention

The present invention relates to an electronic device with a communications function to transmit data by a transmitting means to an audio visual device in a domestic data communications network system.

2. Description of the Prior Art

A Domestic Digital Bus (IEC 84 (Secretariat) 86I,II; Draft-Domestic Digital Bus (D2B)) has been known to communicate data between audio visual devices (referred to as AV devices hereinafter) connected to a common signal transmission path. The AV device provided with such communications means as above has generally worked in the systematic structure illustrated in FIG. 10 through connection via a bus line.

More specifically, for transmitting data between an electronic device (1) 101 and an electronic device (2) 102 in the structure of FIG. 10, conventionally, a frame which is formed in the structure shown in FIG. 11 is used and the data are stored in a data field (DF) 123 of the frame from a master transmitter side to a slave receiver side. In other words, two kinds of transmitting procedures as shown in FIGS. 13a and 13b are conducted, i.e., a procedure A for reading data and a procedure B for writing data.

The structure of the frame shown in FIG. 11 is common to the embodiment of the present invention.

In the procedure A, the master (electronic device (1)) 101, with specifying a preliminarily determined read address, reads out a part of the content stored in a memory unit of the slave (electronic device (2)) 102. In this case, the master transmits a memory address designating frame 135 shown in FIGS. 13a and 13b, then a read data requiring frame 136 and a read slave status frame 137 to the slave 136. In the memory address designating frame 135, a preliminarily defined 12-bit address of the master (electronic device (1)) 101 is stored in a master address 115 in FIG. 11, a preliminarily-defined 12-bit address of the slave (electronic device (2)) 102 is stored in a slave address 116, a code (b3b2b1b0='1000'B) indicating a write memory address with lock (WMA+L) shown in FIG. 12 into a control bit 117, and a memory read address preliminarily defined 1:1 corresponding to the content of the memory unit which the master (electronic device (1)) 101 desires to read out from the slave (electronic device (2)) 102 into a data bit 118. On the other hand, in the read data requiring frame 136, the same values as in the memory address designating frame 135 are stored in the master address 115 and slave address 116, a code (b3b2b1b0='0011'B) indicating a read data with lock (RD+L) is stored in the control bit 117, and the content in a memory area which is rendered corresponding by the memory read address in the memory unit of the slave (electronic device (20) 102 is stored in the data bit 118. Furthermore, in the read slave status frame 137, the same values as in the memory address designating frame 135 are stored in the master address 115 and slave address 116, a code (b3b2b1b0='0110'B) indicating a read slave status with unlock (RSS+UL) is stored in the control bit 117, and the content of the slave status of the slave (electronic device (2)) 102 is stored in the data bit 118. The data bit 118 of the memory address designating frame 135 is transferred in a direction of the write action (MS)131 of FIG. 11, while the data bit 118 of the read data requiring frame 136 is transferred in a direction of the read action (SM)132 shown in FIG. 11. Likewise, the data bit 118 of the read slave status frame 137 is transferred in the (SM)132 direction. The read slave status frame 137 is used so as to release an indication of the master that the slave should be locked.

Meanwhile, in the procedure B, the master (electronic device (1)) 101 simply transfers the data to the slave (electronic device (2)) 102 through consecutive transmission of one or a plurality of write data transferring frames 138 and one write data transferring frame 139 of FIG. 13b. In this case, a preliminarily defined 12-bit address of the master (electronic device (1)) 101 is stored in the master address 115 of each of the write data transferring frames 138 and write data transferring frame 139, and a preliminarily defined 12-bit address of the slave (electronic device (2)) 102 is stored in the slave address 116 of each frame. A code (b3b2b1b0='1011'B) representing a write data with lock (WD+L) as indicated in a table of FIG. 12 is stored in the control bit 117 of the write data transferring frame 138. Moreover, a code (b3b2b1b0='1111'B) indicating a write data with unlock (WD+UL) is written and stored in the write data transferring frame 139.

Transmission of data has been carried out in the foregoing manner heretofore.

However, the above-described conventional method for transmission of data in the electronic devices with a data transmission function is found disadvantageous in the following points.

(a) The data is transmitted between a master electronic device and a slave electronic device using two procedures for respective different purposes. In other words, a transmitting procedure when the master reads out the content stored in the memory unit of the slave as data is different from the procedure when the master writes the content stored in the memory unit thereof into a memory unit of the slave. Therefore, no unity is found in the data transmission function, requiring complicated processes in actual communications.

(b) The structure of a communications means within the electronic device realizing both transmission of data and transmission of commands is not clear, and moreover, the role of the communications means in the data transmitting function is not clearly defined. Furthermore, the format, definition and role of the memory address designating frame are not identified between writing and reading processes, whereby the structure of the communications means, in terms of both hardware and software, results in tedious inconsistency.

SUMMARY OF THE INVENTION

The present invention has been developed with a view to substantially eliminating the above-described disadvantages inherent in the prior art, and has for its essential object to provide an electronic device with a uniform data transmission function adapted to communicate data through memory access, while solving complexities in actual installation and communications process, wherein a communications means is constituted in a manner to realize transmission of both data and command in the communications process.

In accomplishing the above-described object, in the electronic device according to the present invention, a format is defined so that a data field (DF) of a memory access designating frame sent from a master to a slave is provided with a writing unit of data related to the type of access, i.e., reading or writing and a memory storing address. It is so arranged in the electronic device of the present invention that the memory access designating frames are preliminarily transferred commonly before the transmission of a read data requiring frame or a write data transferring frame. At the same time, a device unit of the electronic device of the present invention which unit provides a communications means for executing data transmission is constituted at least of a device controlling part, a data transmission processing part and a communications part.

In the structure as above, the present invention will achieve the following effects.

That is, when the master indicates either writing or reading of data to the slave when the data are to be transmitted between the master electronic device and the slave electronic device, the type of access and a memory storing address at the slave side are sent from the device controlling part of the master to the data transmission processing part, thereby starting the memory access communications process for the data transmission. At this time, if writing of data is indicated, the data to be transferred is also sent from the device controlling part to the data transmission processing part. Consequently, the data transmission processing part assembles a memory access designating frame based on the transmission information sent from the master side and sends the same to a data transmission processing part of the slave through a communications part. The data transmission processing part at the slave side discriminates the type of access in preparation for every process to receive a write data transferring frame or a read data requiring frame subsequently sent from the master. After the data are completely transferred between the master and slave sides by the write data transferring frame or read data requiring frame, each data transmission processing part of the master and slave sides transmits the result of communications, i.e., the content of the data, to the respective device controlling part. In this manner, writing or reading of the data is realized.

BRIEF DESCRIPTION OF THE DRAWINGS

This and other objects and features of the present invention will become apparent from the following description taken in conjunction with one preferred embodiment thereof with reference to the accompanying drawings, in which:

FIGS. 4a, 4b and 4c taken together is a flowchart showing the transition of the receiving state of the frame in a data transmission processing part of the embodiment;

FIGS. 6a, 6b and 6c taken together is a flowchart showing the transition of the receiving state in a communications controlling part of the embodiment;

FIG. 7 is a flowchart showing the transition of the transmitting state in the communications controlling part of FIGS. 6a, 6b and 6c;

FIG. 8 is a flowchart showing the transition of the receiving state in a device controlling part of the embodiment;

FIG. 9 is a flowchart showing the transition of the transmitting state in the device controlling part of FIG. 8;

FIG. 11 is a structural diagram of a frame common to the embodiment of the present invention and the conventional example;

FIG. 12 is a table explanatory of the definition of a control bit common to the embodiment of the present invention and the conventional example.

DETAILED DESCRIPTION OF THE INVENTION

Figure 1:
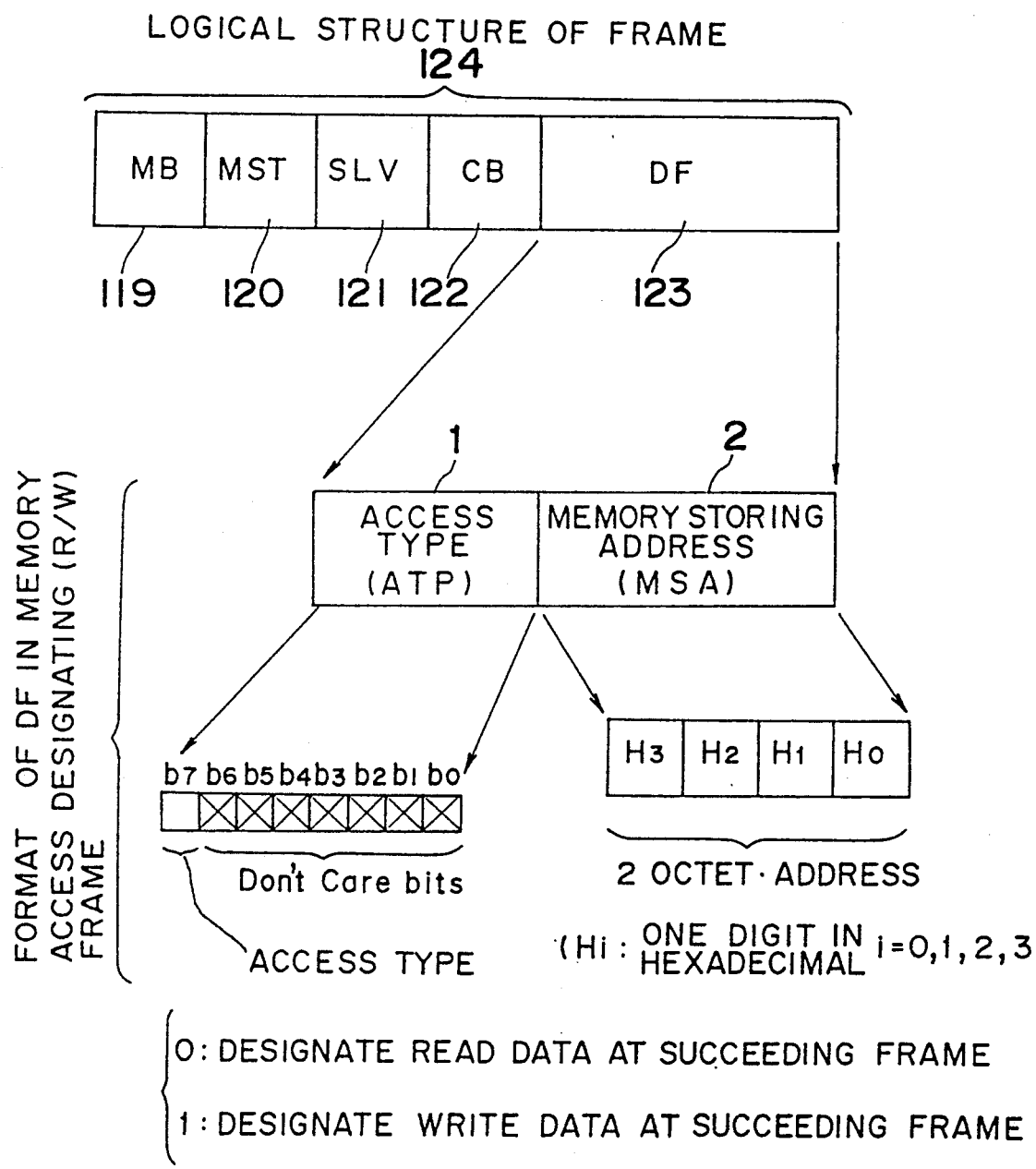
FIG. 1 is a diagram explanatory of a format of a data field of a memory access designating (R) frame/memory access designating (W) frame in one embodiment of the present invention.

Before the description of the present invention proceeds, it is to be noted here that like parts are designated by like reference numerals throughout the accompanying drawings.

Figure 2:
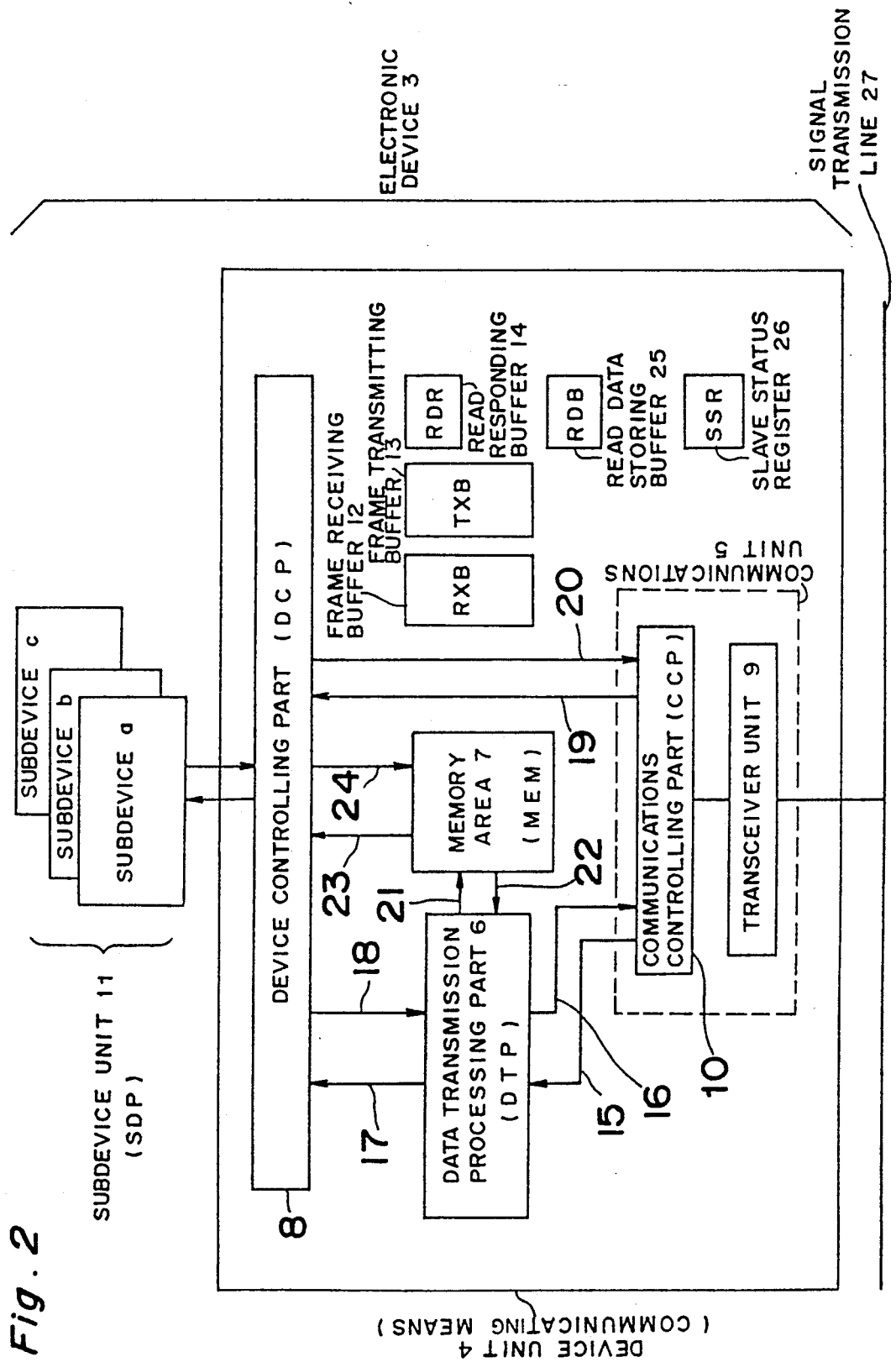
FIG. 2 is a structural diagram of a device unit offering a communications means of the embodiment.
Figure 3A:
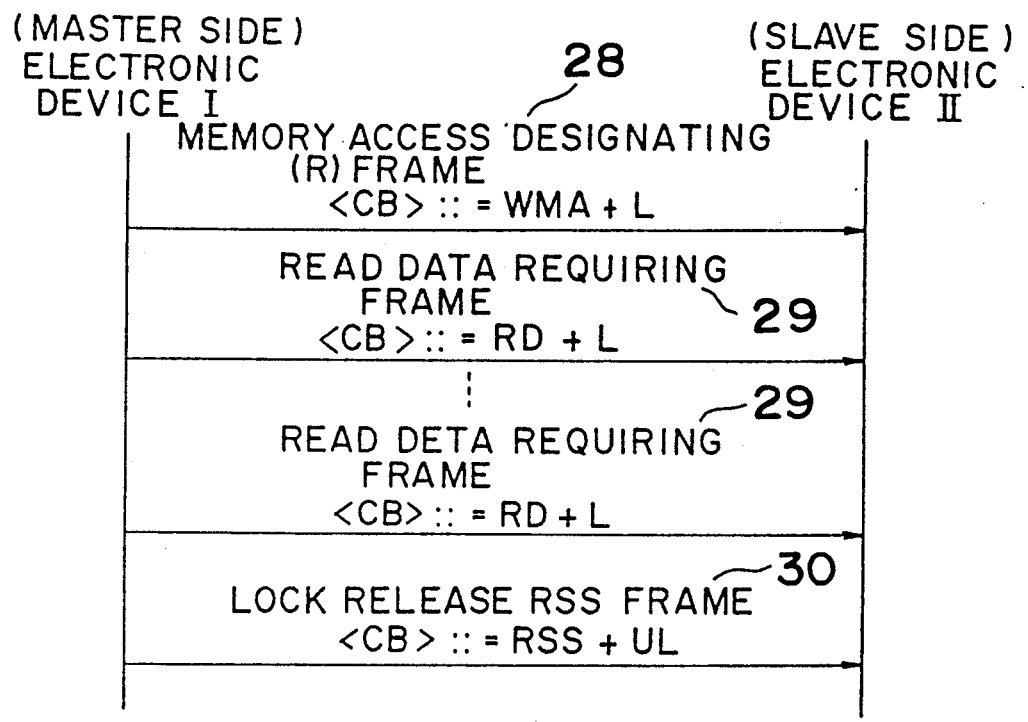
FIGS. 3a and 3b are diagrams showing communications sequences in reading and writing operations of the embodiment.
Figure 3B:
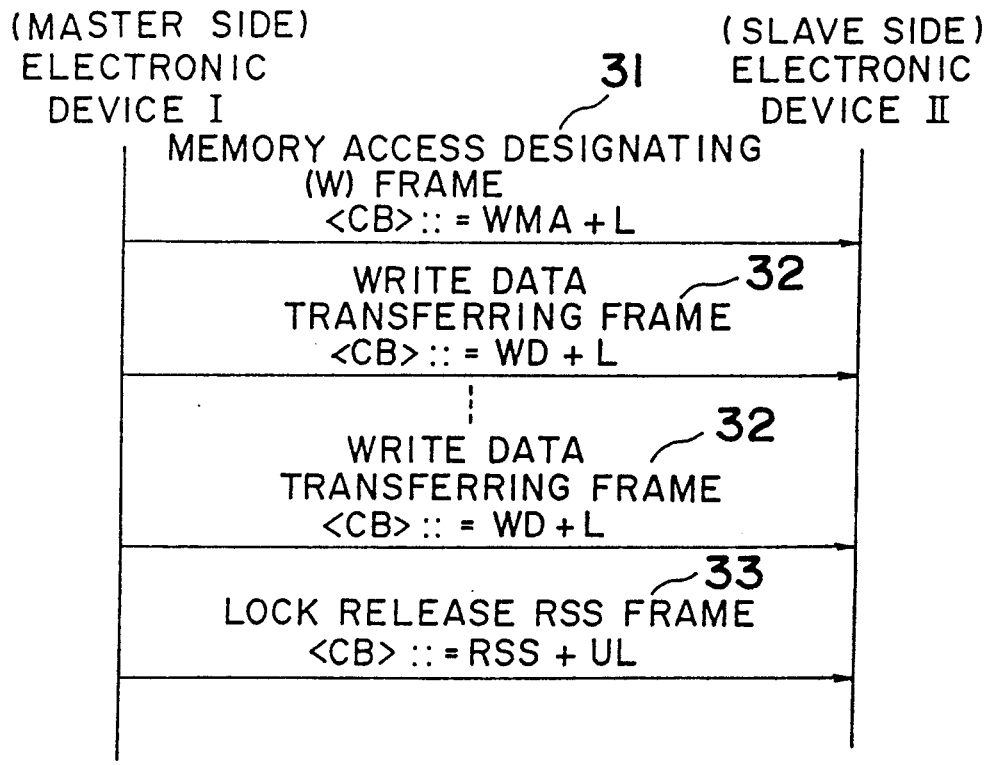
Figure 4B:
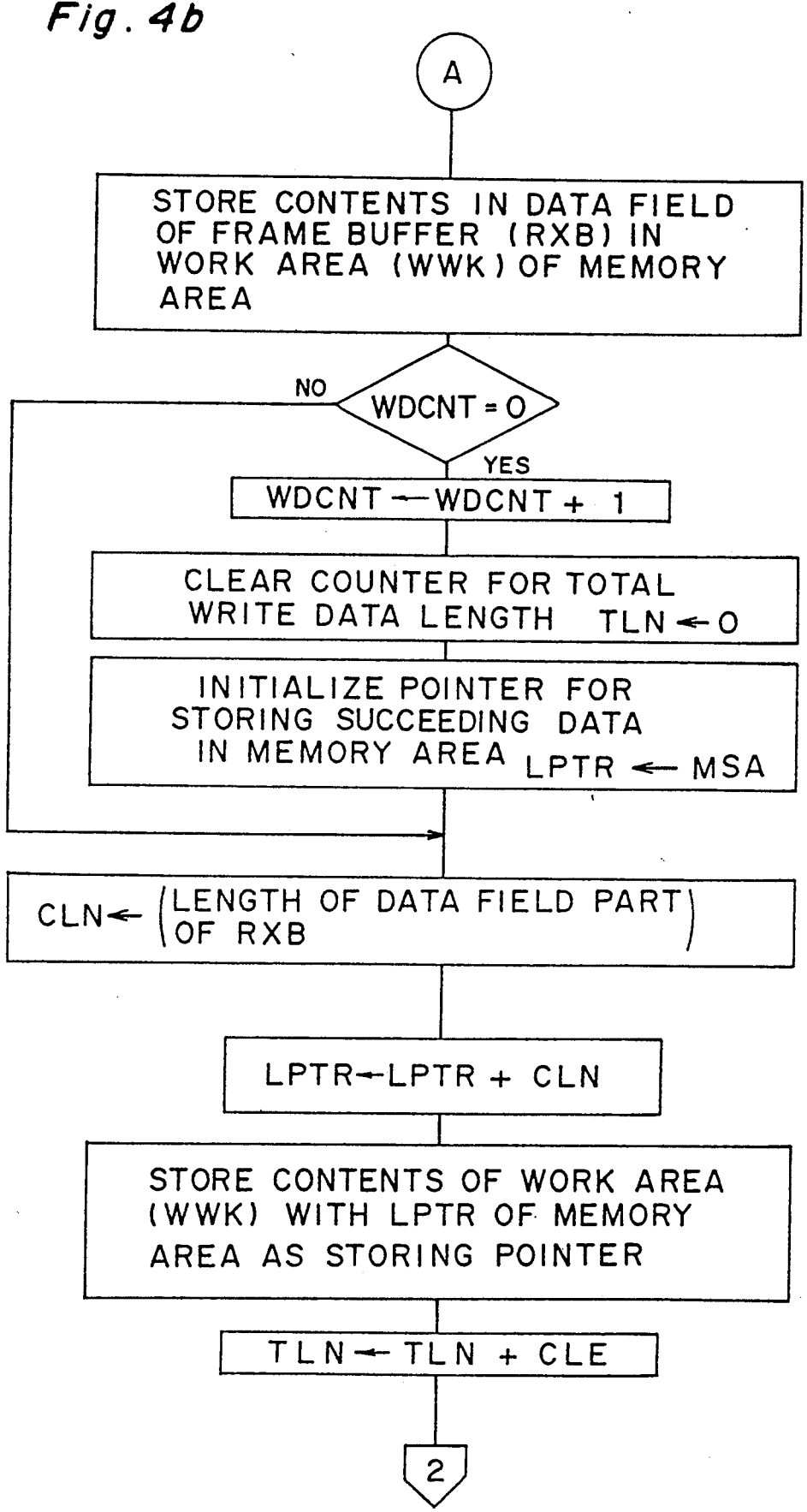
Figure 4C:
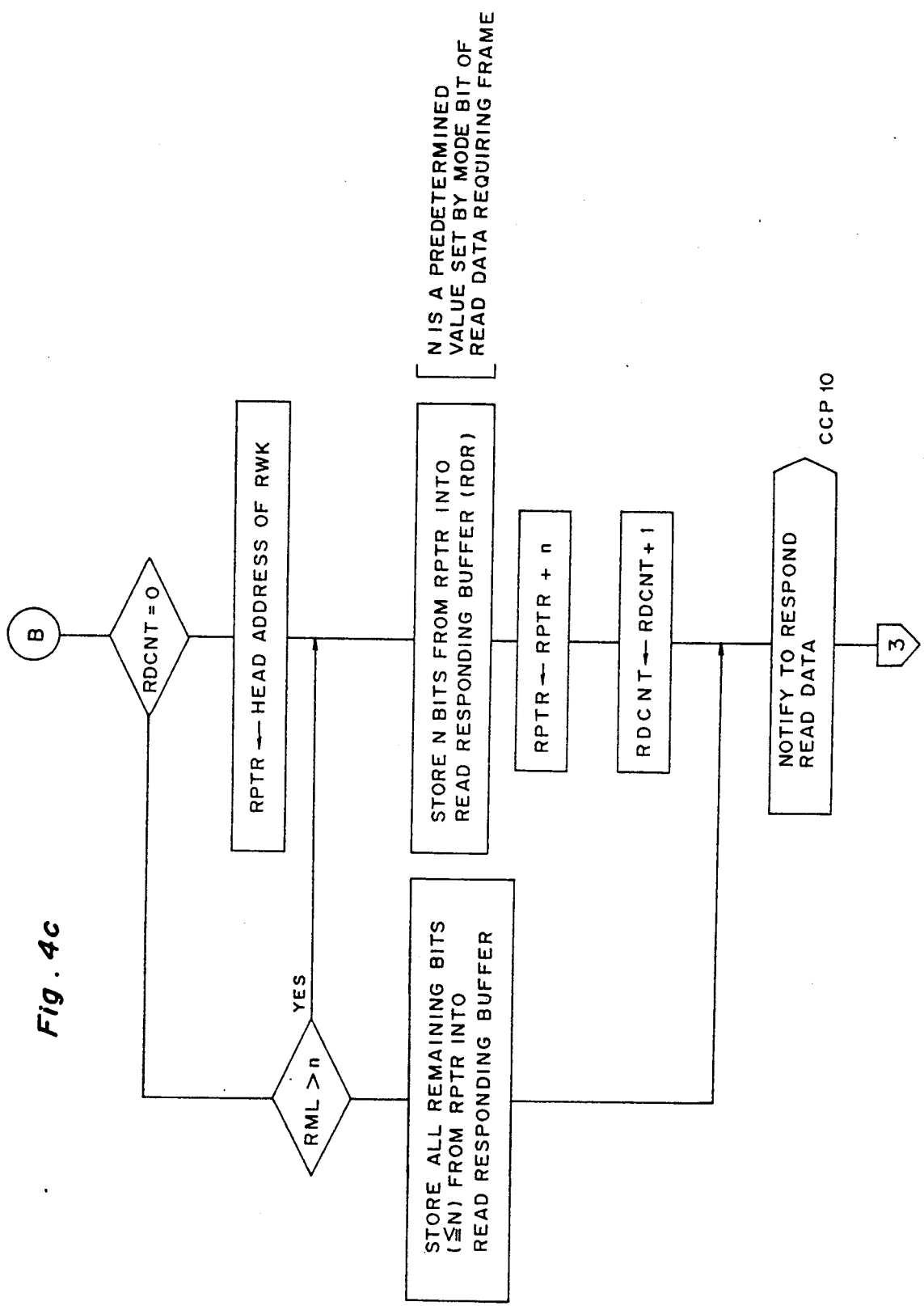
Figure 5A:
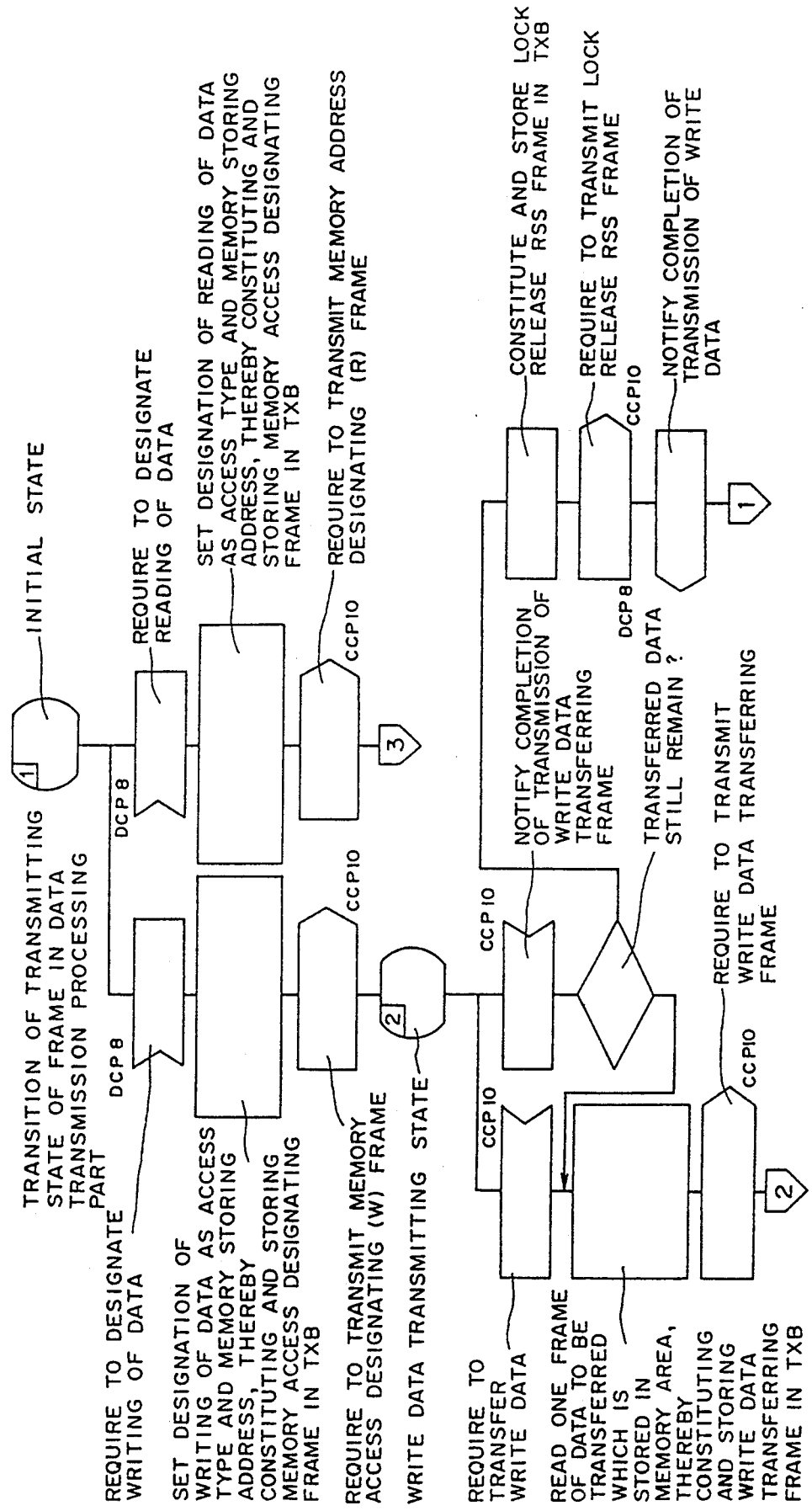
FIGS. 5a and 5b taken together is a flowchart showing the transition of the transmitting state of the frame in the data transmission processing part of FIG. 4.
Figure 5B:
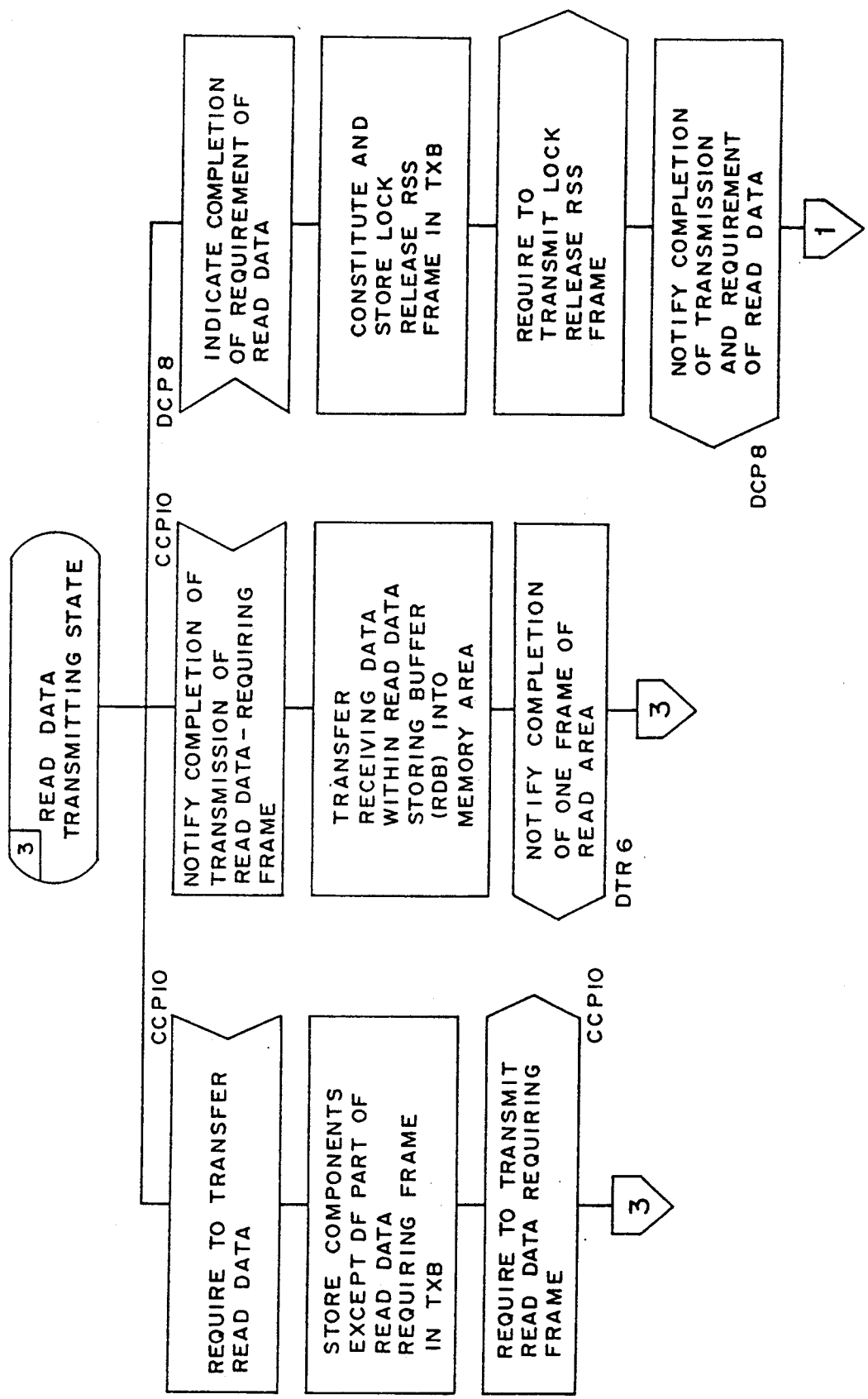

Referring first to FIG. 1, there is shown a logical structure of a memory access designating (R) frame/memory access designating (W) frame according to one preferred embodiment of the present invention. A format of a data field is shown as well. The detailed format and definition of each field constituting the above frame are the same as in the conventional example shown in FIGS. 11 and 12 except the definition of DF123 when a control bit 117 represents (WMA+L). FIG. 2 illustrates the structure of a device unit which offers a communications means in an electronic device of the present embodiment. FIGS. 3a and 3b explain the communications sequence in each of reading and writing operations during data transmission between a master electronic device and a slave electronic device. FIGS. 4a, 4b and 4c taken together shows the transition of the receiving state of the frame in a data transmission processing part of the device unit of FIG. 2 based on SDL description (CCITT, Z series recommendation). FIGS. 5a and 5b taken together is a diagram showing the transition of the transmitting state of the frame in the data transmission processing part of FIG. 2 on SDL description. Similarly, FIGS. 6a, 6b and 6c taken together is a SDL description showing the transition of the receiving state in a communications controlling part within a communications unit in FIG. 2, FIG. 7 is a SDL description showing the transition of the transmitting state in the communications controlling part within the communications unit of FIG. 2, FIG. 8 is a SDL description showing the transition of the receiving state in the device controlling part of FIG. 2, and FIG. 9 is a SDL description showing the transition of the transmitting state in the device controlling part of FIG. 2.

It is to be noted here that the present invention is not restricted to the format illustrated in FIG. 1, nor to the structure of the device unit within the electronic device in FIG. 2 and the transition of the state indicated by SDL descriptions in FIGS. 3 through 9.

Each component in the electronic device of the present embodiment will be discussed in detail hereinbelow.

In the diagram of FIG. 1, numeral 1 represents a part of the components constituting a data field (DF) 123 in a memory access designating (R) frame/memory access designating (W) frame, and particularly representing the type of access (ATP) to identify whether a frame transferred from the master to the slave subsequent to the memory access designating frame is a read data requiring frame which requires the data to be read out from the slave or a write data transferring frame which requires the data to be written into the slave. When the type of access 1 designates the reading of data, a read address in a memory area of the slave side which the master reads is stored in a memory storing address (MSA) 2 as an access address. On the other hand, when the access type 1 designates the writing of data, a write address in a memory area of the slave side into which the master writes is stored in the memory storing address (MSA) 2. The description as to the logical structure of the main components 119 to 124 of the frame will be abbreviated here since the structure thereof is identical with that of the prior art shown in FIG. 11.

With reference to FIG. 2, an electronic device 3 consists of a device unit 4 and a subdevice unit 11. The device units 4 with a data transmission function are connected to each other via a common signal transmission line 27. The subdevice unit 11 carries out control of the whole device.

The device unit 4 functions as a communications means, having a communications unit 5, a data transmission processing part 6 and a device control part 8. The device unit 4 further includes a memory area 7 for use as a storing area of the data transmitted between the master and slave, a frame receiving buffer 12, a frame transmitting buffer 13, a read responding buffer 14, a read data storing buffer 25 and a slave status register 26. The device unit 4 works as an interface with the subdevice unit 11.

The communications unit 5 is provided with a transceiver unit 9 and a communications controlling part 10.

The data transmission processing part 6 (DPT) which is a main component of the electronic device of the present embodiment is positioned between the communications control part 10 and device controlling part 8, with managing and processing each communications sequence in reading and writing the data between the master and slave through memory access. Information necessary for the communications process is sent and received between the data transmission processing part 6 and communications controlling part 10 via signals 15 and 16 and various kinds of registers 12, 13, 14, 25 and 26. Besides, information necessary for transmission of data is sent and received between the data transmission processing part 6 and device control part 8 via signals 17 and 18 and memory area 7 where the data to be read or written is transferred between the master and slave.

The memory area (MEM) 7 stores data to be written by the master into the slave. The data is fed from the device control part 8 at the master side via a signal 24 and sent to the data transmission processing part 6 via a signal 22. Moreover, the memory area (MEM) 7 stores data to be read out by the master from the slave. The data read from the slave side extracted from a receiving frame of the data transmission processing part 6 at the master side is stored in MEM 7 via a signal 21 is sent to the device control part 8 which indicates reading of the data via a signal 23. Moreover, when the master commands the slave side to read data, the data to be read is preliminarily stored and retained in MEM 7 before the data transmission processing part 6 at the slave side reads the data via a signal 22.

The device controlling part (DCP) 8 sends a command generated from a subdevice unit 11 or from itself to a communications controlling part 10 via the frame transmitting buffer 13 and a signal 20 requiring transmission of the command, and at the same time, receives and processes the content of a frame including the command and received by the communications controlling part 10 via the frame receiving buffer 12 and a signal 19 acknowledging the receipt of the command, while indicating reading of the data from the master to the slave via signals 18, 24 and 22 and memory area 7 when such an indication is generated from the subdevice unit 11 or by itself, or indicating reading of the data via signals 18, 21 and 23 and memory area 7. Furthermore, when the data is written from the master to the slave, DCP 8 is informed of the completion of the writing process at the data transmission processing part 6 to the memory area 7 via a signal 17.

A transceiver unit 9 is connected to the signal transmission path 27, working as an interface of electrophysical conditions.

The communications controlling part (CCP) 10 offers a communications controlling function necessary for transmission of the content of DF 123 of the frame of FIG. 1 between the master and slave in a transparent manner. The CCP 10 is connected to the data transmission processing part 6 and device controlling part 8, with making an access to the various kinds of registers, so that CCP 10 functions at least to indicate processing of a receiving frame to the data transmission processing part 6 when the content indicated by a control bit CB 122 of the receiving frame through the signal transmission path 27 is a memory address with lock (WMA+L), a read data with lock (RD+L) or a write data with lock (WD+L), or to indicate processing of the frame directly to the device controlling part 8 when the content indicated by the control bit is a write command with lock (WC+L).

The subdevice unit 11 is comprised of various kinds of controlling circuits as subdevices such as a deck controlling circuit, a tuner controlling circuit, audio signal controlling circuit, video signal controlling circuit, input/output manipulation display controlling circuit, etc. The controlling circuits are classified for every function common or peculiar to an audio visual device. When the subdevice unit 11 is connected to the device controlling part 8, data can be transferred between the master and slave or a command is required to be transmitted or received.

The frame receiving buffer (RXB) 12 is employed at the communications controlling part 10 and data transmission processing part 6 to temporarily store the content of the frame 124 of FIG. 1 in the event that the frame is to be received.

The frame transmitting buffer (TXB) 13 is employed at the device controlling part 8 and data transmission processing part 6 to temporarily store the content of the frame 124 of FIG. 1 in the event that the frame is to be transmitted.

Meanwhile, the read responding buffer 14 is used to temporarily store the data to be transferred to the slave at a read action section in DF 123 of a read data requiring frame.

The read data storing buffer 25 is used, in contrast to the buffer 14, to temporarily store the data of DF 123 of the read data requiring frame transferred from the slave side when the read data requiring frame is transmitted by the master.

The slave status register 26 sequentially holds and stores the state of the frame receiving buffer (RXB) 12 as to whether or not it is vacant, or the state of the communications controlling part 10 as to whether it is locked or unlocked, with maintaining information of a predetermined format.

Figure 10:
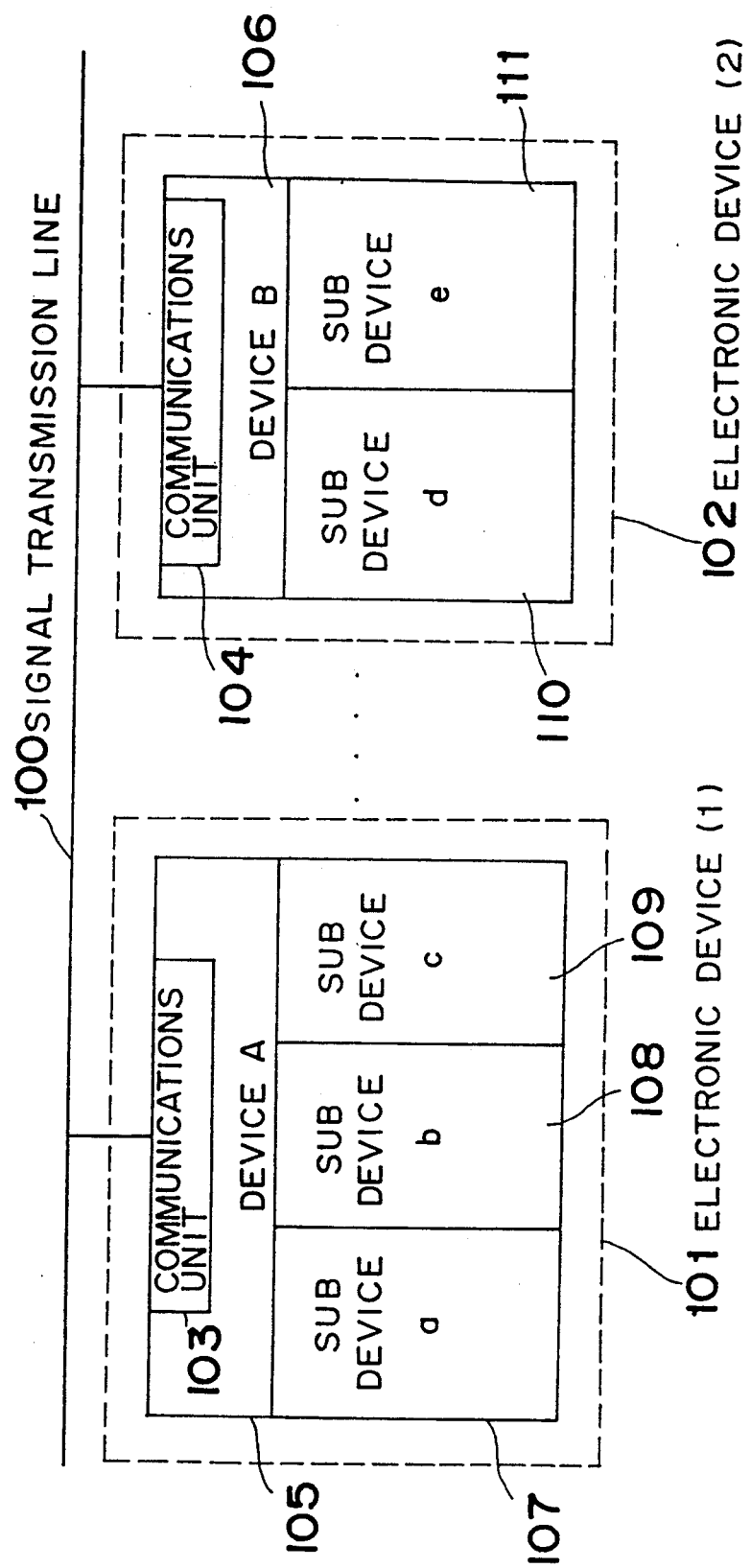
FIG. 10 is a structural diagram of a bus-type communications system common to the embodiment of the present invention and a conventional example.
Figure 13A:
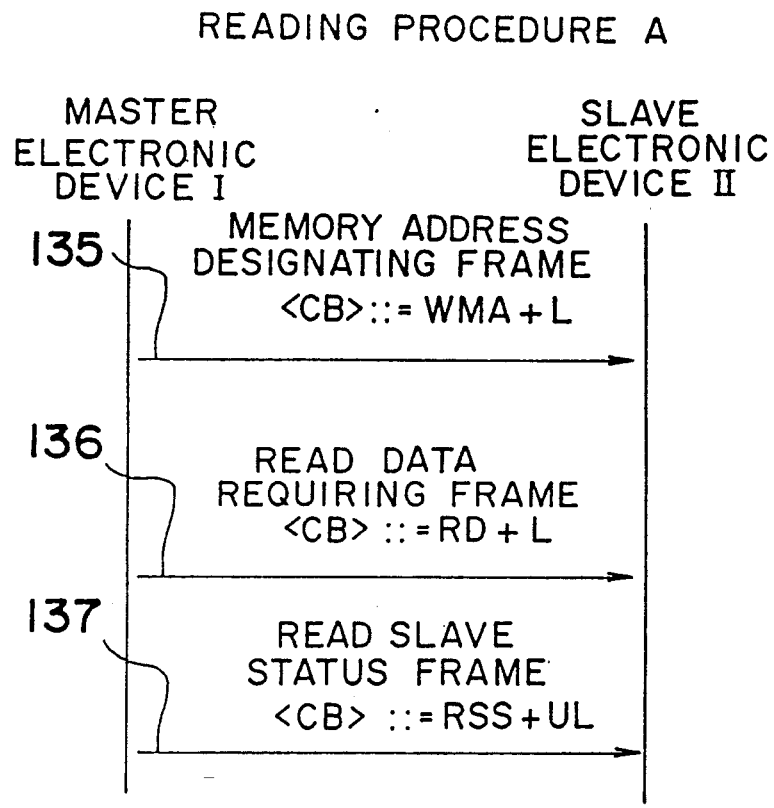
FIGS. 13a and 13b are diagrams showing the communications sequences in reading and writing of data in the conventional example.
Figure 13B:
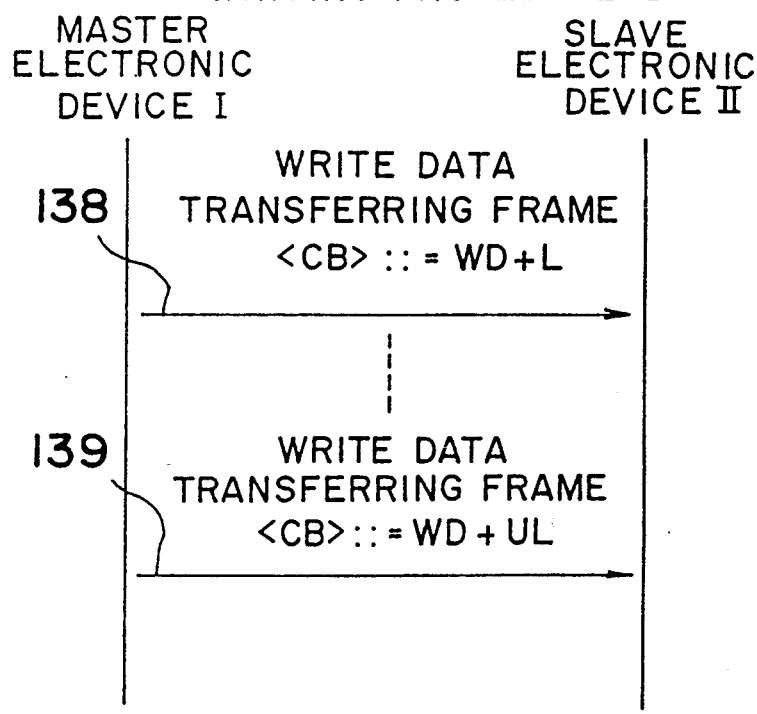

A plurality of electronic devices 3 are connected to each other via the respective communications units 5 through the common signal transmission line 27, so that data is are transmitted between the master and slave devices. The signal transmission line 27 is identical to the signal transmission line 100 shown in FIG. 10.

When the data is transmitted from the communications controlling part (CCP) 10 to the data transmission processing part (DTP) 6, at least four kinds of requirements/notifications (requirement of transmission of a write data, requirement of transmission of a read data, notification of completion of transmission of a write data transferring frame and notification of completion of transmission of a read data requiring frame) are issued through the signal 15. On the other hand, when the frame is received, at least four kinds of requirements/notifications (requirement of responding process of a read data, requirement of receiving process of a write data, notification of completion of a memory access procedure and requirement of a memory access procedure) are transmitted by the signal 15.

A signal 16 transmits at least five kinds of requirements (requirement of transmission of a memory access designating (W) frame, requirement of transmission of a memory access designating (R) frame, requirement of transmission of a write data transferring frame, requirement of transmission of a read data requiring frame, and requirement of transmission of a lock release RSS frame) when the frame is transmitted from the data transmission processing part (DPT) 6 to the communications controlling part (CCP) 10. The signal 16 also transmits a notification of responding to the read data when the frame is received.

The signal 17 transmits at least two kinds of notifications (notification of completion of transmission of a write data and notification of completion of transmission of a read data requiring frame) when the frame is transmitted from the data transmission processing part (DCP) 6 to the device controlling part (DCP) 8, and at least two kinds of notifications (notification of completion of receipt of a write data and notification of completion of receipt of a read data) when the frame is received.

The signal 18 is used to transmit at least three kinds of requirements/indications (requirement of indication of a write data, requirement of indication of a read data and indication of completion of requirement of a read data) only when the frame is transmitted from the device controlling part (DCP) 8 to the data transmission processing part (DTP) 6.

A notification of completion of a read data of at least one frame is issued by the signal 19 when the frame is transmitted from the communications controlling part (CCP) 10 to the device controlling part (DCP) 8. Furthermore, when the frame is received, the signal 19 issues at least a notification of completion of receipt of the command.

The signal 20 is used so that at least two kinds of requirements (requirement of transmission of a command frame and requirement of transmission of a lock release RSS frame) are issued only when the frame is transmitted from DCP 8 to CCP 10.

The signal 21 sends information of a memory storing address and a write data to be written at the slave side which is transferred from the master side, thus allowing the data transmission processing part (DTP) 6 to read/write data to the memory area (MEM) 7.

On the other hand, the signal 22 sends from the memory area (MEM) 7 to the data transmission processing part (DTP) 6 at least a read data to be read which is necessary in preparation for DTP 6 at the slave side to respond at least to the requirement of the read data from the master side.

When the device controlling part (DCP) 8 receives the notification of completion of receiving process of a read data from DTP 6, at least the read data is fed from the memory area (MEM) 7 to DCP 8 by the signal 23.

When DCP 8 indicates DTP 6 to write data, the write data at the master side to be written in the memory storing address (MSA) 2 at the slave side is given to the memory area (MEM) 7 by the signal 24.

Now, with reference to FIGS. 3a and 3b, the memory access designating (R) frame 28 is used first when the master starts to read the content of a specific data preliminarily defined in the memory area (MEM) 7 of FIG. 2 in the slave electronic device. In the memory access designating (R) frame 28, the control bit CB 122 of FIG. 1 is (WMA+L) and the access type (ATP) 1 in the data field DF 123 has a bit b7=0 (a read data is designated by a succeeding frame). The memory storing address (MSA) 2 at the slave side into which the data are read is set succeeding to the ATP 1 in the frame 28.

The frame 29 is a read data requiring frame in which the control bit 117 of FIG. 11 is (RD+L) of FIG. 12, and which is used when the master reads the data from the slave side using the read action section (SM) 132 of the data field DF 123 in FIG. 11.

The lock release RSS frame 30 is used to notify the completion of a series of reading procedures from the master to the slave by the memory access designating (R) frame 28 and read data requiring frame 29 and to indicate release of the locking state of the slave by the master side.

The frame 31 is first used to transmit the data from the master to the slave when the data is written into a specific storing area preliminarily defined in the memory area (MEM) 7 shown in FIG. 2. The control bit CB 122 of FIG. 1 of the frame 31 represents (WMA+L) and the access type (ATP) 1 in DF 123 of the frame has a bit b7=1 (the succeeding frame indicates a write data). The memory storing address (MSA) 2 at the slave side into which the data are written is set following the ATP 1.

The frame 32 which is a write data transferring frame used by the master when the data is written into the slave side using a write action section (MS) 131 of the data field DF 123 of FIG. 11. The frame 32 has the control bit 117 of FIG. 11 to represent (WD+L) cf FIG. 12.

The lock release RSS frame 33 in the same format as the frame 30 is used to notify the completion of a series of writing procedures by the master to the slave by the memory access designating (W) frame 31 and write data transmitting frame 32, and to indicate release of the lock of the slave by the master.

Figure 6A:
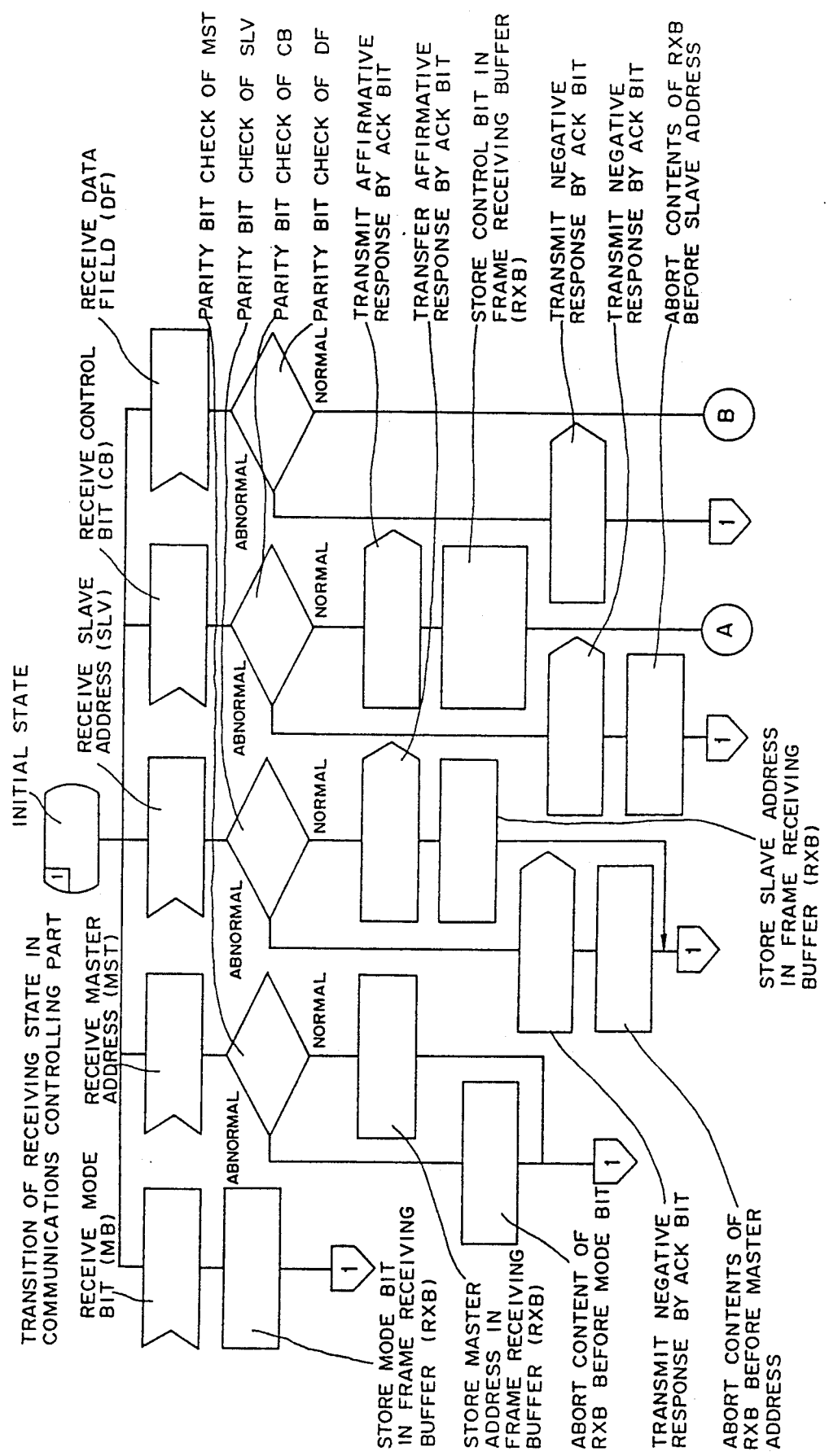
Figure 6C:
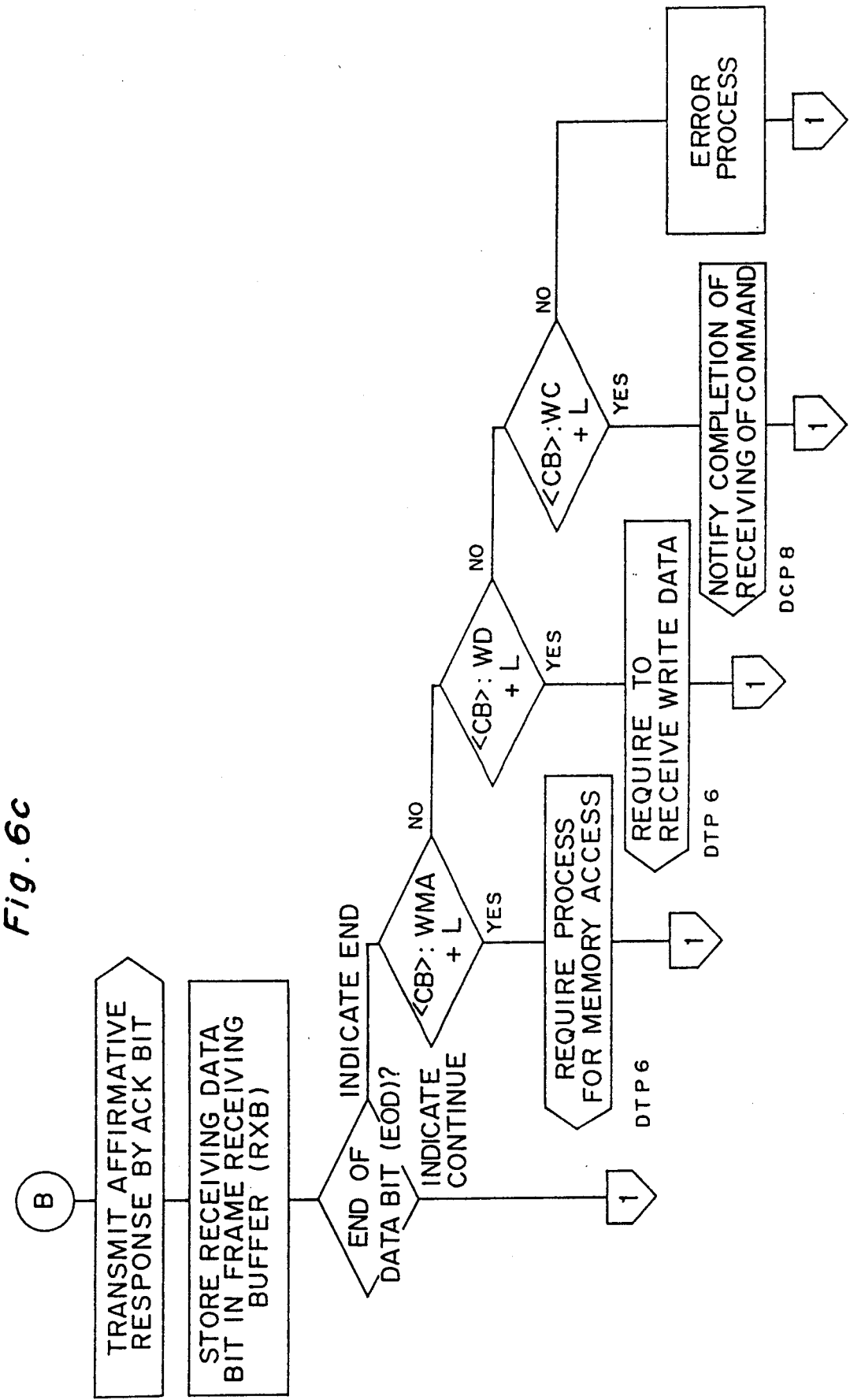

The internal operation of the device unit 4 in the above-described construction will be described more in detail hereinbelow. In the first place, the operation of the communications controlling part (CCP) 10 of FIG. 2 will be explained. CCP 10 carries out the operation for transition thereof into the receiving state as shown in FIGS. 6a, 6b and 6c when a frame is to be received between the master and slave via the transceiver unit 9 through the signal transmission line 27. When the frame is to be transmitted, CCP 10 carries out the operation for transition thereof into the transmitting state as depicted in FIG. 7.

As described earlier, the data transmission processing part (DTP) 6 is positioned between the device controlling part (DCP) 8 and communications controlling part (CCP) 10, and is responsible for the whole writing/reading processes including management of the procedures therefor. According to the present embodiment, when the frame is to be received, DTP 6 carries out the operation of transition thereof into the receiving state in accordance with a flow of FIGS. 4a, 4b and 4c, while performing the operation for transition into the transmitting state shown in FIGS. 5a and 5b when the frame is to be transmitted.

Meanwhile, given that the operation of DTP 6 and CCP 10 for transition into the transmitting/receiving state is a communications processing function offered to DCP 8, and this communications processing function is divided into the receiving process and the transmitting process, DCP 8 performs the operation for transition into the receiving state as the receiving process in reading or writing the data as indicated in FIG. 8 and the operation for transition into the transmitting state as shown in FIG. 9 as the transmitting process.

When the device unit 4 performs writing of data from the master side to the slave side with using the above DCP 8, DTP 6 and CCP 10, that is, in realizing the writing operation of FIG. 3b, the master side and slave side will operate in compliance with respective flows indicated in FIGS. 4 through 9.

The operation at the master side will be discussed in the items <1> to <8> described below.

<1> In the event that data of a desired length should be transferred to an electronic device (at the slave side) having the same structure of the device unit 4 as the master electronic device 3 of FIG. 2 and is connected to the subdevice unit (SDP) 11 or device controlling part (DCP) 8 at the master side through the signal transmission line 27, so that the data be written into the memory area (MEM) 7 at the slave side, DCP 8, when confirming the generation of a requirement of transmission of the data at the initial state (1) of FIG. 9, stores the write data to be transferred into MEM 7 and sends to DIP 6 a preliminarily defined absolute/relative address into which the data to be transferred is written at the slave side as a memory storing address. At the same time, DCP 8 issues a requirement of indication of the write data to DTP 6. As a result, DCP 8 is turned into a write data transmitting state (2).

<2> When DTP receives the requirement of indication of the write data from DCP 8 at the initial state (1) in FIG. 5a, DTP 6 assembles a memory access designating (W) frame and stores the same in TXB 13 of FIG. 2 on the basis of the access type of the indication of the write data and the memory storing address given from DCP 8, and then issues a requirement of transmission of the memory access designating (W) frame to CCP 10. The internal state of DPT 6 is changed into the write data transmitting state (2).

<3> With reference to FIG. 7, CCP 10 receives the requirement of transmission of the memory access designating (W) frame, CCP 10 reads the content temporarily stored in TXB 13, thereby transmitting the frame to the slave side through the transceiver unit 9 and signal transmission line 27. Moreover, CCP 10 issues a requirement of transfer of the write data to DTP 6. At this time, CCP 10 is maintained at the present initial state (1).

<4> When DTP 6 receives the requirement of transfer of the write data from CCP 10 at the state (2) shown in FIG. 5a, DTP 6 reads the data of a predetermined length to be transferred which is stored in MEM 7 by DCP 8 and is transmittable by one frame, then assembles and stores a write data transferring frame in TXB 13. At the same time, a requirement of transmission of the write data transferring frame is issued by DTP 6 to CCP 10. The internal state of DTP 6 is maintained at the present write data transmitting state (2).

<5> CCP 10 reads the content temporarily stored in TXB 13 when it receives the requirement of transmission of the write data transferring frame from DTP 6 at the initial state (1) in FIG. 7. After CCP 10 transmits the frame to the slave, CCP 10 issues a notification of completion of transmission of the write data transferring frame to DTP 6. CCP 10 is kept at the present initial state (1).

<6> In consequence, DTP 6 receives the notification of completion of transmission of the write data transferring frame at the write data transmitting state (2) of FIG. 5a. Then, DTP 6 makes it clear whether the data stored in MEM 7 beforehand still remains to be transferred. If some data remains without being transferred, DTP 6 carries out the process described in the above item <4>. On the other hand, when the data are completely transferred, a lock release RSS frame is assembled so that the writing operation in the slave is stopped. The lock release RSS frame is stored in TXB 13. Thereafter, DTP 6 issues a requirement of transmission of the lock release RSS frame to CCP 10, and a notification of completion of transmission of the write data to DCP 8 as well. The internal state of DTP 6 is moved to the initial state (1).

<7> As the requirement of transmission of the lock release RSS frame is received from DTP 6 to CCP 10 at the initial state (1) of FIG. 7, CCP 10 reads the content temporarily stored in TXB 13, thereby carrying out the transmitting process of the frame to the slave. CCP 10 is maintained at the present initial state (1).

<8> At the write data transferring state (2) shown in FIG. 9, when DCP 8 receives the notification of completion of transmission of the write data from DTP 6, DCP 8 notifies the subdevice unit (SDP) 11 of the completion of transmission of the write data upon necessities. Thereafter, the internal state of DCP 8 is returned to the initial state (1).

The operation at the slave side will now be discussed in the following items <9> to <16>.

<9> CCP 10 at the slave side of FIG. 2 starts to receive any frame 124 of FIG. 11 transmitted from the master side through the signal transmission line 27 and transceiver unit 9 along the flow indicated in FIG. 6a, 6b and 6c, whereby a mode bit 114 to a slave address 116 in the frame 124 are correctly received. Further, when CCP 10 receives a control bit 117 in a normal manner, it checks the content of the control bit 117. Since the memory access designating (W) frame is transmitted first from the master side in this case, CCP 10 sets the slave in the locking state as indicated by the master side if the control bit 117 CB=(WMA+L), and stands at the initial state (1) waiting for normal receipt of a data field 123 of the frame 124 which is being received. Subsequently, if the data field 123 is completely received normally before an EOD appears, CCP 10 discriminates whether the already received control bit 117 of the frame including the data field 123 was (WMA+L). If the control bit 117 was (WMA+L), CCP 10 issues a requirement of a memory access procedure to DTP 6 within the device unit 4 at the slave side thereby to notify start of the memory access procedure. At the same time, the internal state of CCP 10 is maintained at the initial state (1). On the contrary, if the control bit 117 was not (WMA+L), CCP 10 performs the operation for transition into the other states shown in FIGS. 6a, 6b and 6c.

<10> When DTP 6 receives the requirement of the memory access procedure from CCP 10 at the initial state (1) of FIG. 4a, DTP 6 extracts an access type (ATP) 1 and a memory storing address (MSA) 2 of a data bit 118 of RXB 12 temporarily stored by CCP 10, so that the ATP 1 is determined. As a result, if the ATP 1 is writing of data, a receiving counter (WDCNT) of the write data transferring frame 32 is cleared to 0, and the internal state of DTP 6 is changed to the write data receiving state (2).

<11> When CCP 10 receives normally the write data transferring frame 32 shown in FIG. 3b at the initial state (1) of FIG. 6a, a requirement of receiving process of the write data is issued to DTP 6. The internal state of CCP 10 is kept as it is.

<12> Accordingly, when DTP 6 receives the requirement of receiving process of the write data from CCP 10 at the state (2) of FIG. 4a, DTP 6 reads the content of the data field of RXB 12 and stores the memory storing address (MSA) 2 extracted in the process depicted in the foregoing item <10> through a temporary storing work area (WWK) of MEM 7 into a designated memory section of MEM 7 defined as a head address. The present internal state of DTP 6 is maintained.

<13> If CCP 10 normally receives a plurality of succeeding write data transferring frames from the master side to the slave side, with issuing a requirement of receiving process of the write data to DTP 6, DTP 6 repeats the process in the item <12> above along the flow in FIGS. 4a and 4b.

<14> After CCP 10 confirms at the initial state (1) of FIG. 6a that the control bit is (RSS+L) while it normally receives the lock release RSS frame 32 of FIG. 3b, it transfers the present content of a preliminarily set slave status register (SSR) 26 from the slave side to the master side at the data field DF 123 of the lock release RSS frame which is being received, using the read action section (SM) 32 shown in FIG. 11. Then, CCP releases the slave side from the locking state, and further issues a notification of completion of the memory access procedure to DTP 6. The internal state of CCP 10 is changed to the initial state (1).

<15> When DTP 6 receives the notification of completion of the memory access procedure at the write data receiving state (2), it completes the write data receiving process, issuing a notification of completion of receipt of the write data to DCP 8. Thus, the internal state of DTP 6 is moved to the initial state (1). Upon necessities, DTP 6 notifies DCP 8 of the memory storing address (MSA) 2 with using the signal 17.

<16> When DCP 8 receives the notification of completion of receipt of the write data from DTP 6 at the initial state (1) in FIG. 8, it acknowledges that the transferring process of the write data from the master side is completed, and thereafter reads and processes the receiving data from MEM 7 with using the memory storing address (MSA) 2 obtained from DTP 6.

Moreover, DCP 8 notifies the necessary processing result to the subdevice unit (SDP) 11 by the use of a communications procedure or the like. The internal state of DCP 8 is changed to the initial state (1).

The writing operation of FIG. 3b can be easily performed by the above-described processes.

The reading operation of FIG. 3a can also be performed easily in accordance with the processes shown in the flowcharts of FIGS. 4–9, and therefore the description thereof will be abbreviated here.

In addition, the operation for transition of the internal state in each of the device controlling part (DCP) 8, data transmission processing part (DTP) 6 and communications controlling part (CCP) 10 which are main components of the device unit 4 according to this embodiment can be realized in any of the following manners in practice.

Each component is constructed independently of exclusive hardware logic.

Each component is constituted independently as a software/firmware of a microprocessor of 16 bits, 8 bits, 4 bits, etc.

Two of the DCP 8, DTP 6 and CCP 10 are constructed based on special hardware logic, and the remaining one is formed of a software/firmware of a microprocessor.

Two of the DCP 8, DTP 6 and CCP 10 are formed of a hardware/firmware of a special or general-purpose microprocessor, and the remaining one is constructed according to hardware logic.

All of the DCP 8, DTP 6 and CCP 10 are constituted of a software/firmware of a single special or general-use microprocessor, or based on single special hardware logic.

As described hereinabove, the present invention provides a communications means which has a function realizing easy transmission of data.

Besides, the following effects are achieved by the present invention.

(A) Two different processes (writing and reading) for transfer of data between the master side and slave side are rendered common and uniform by using the definition of a format whereby a data field is made common to the memory access designating (R) frame and the memory access designating (W) frame, and a simple means for notifying completion of each of the above processes. Furthermore, complexities in installing the above processes are removed.

(B) A communications means within an electronic device responsible for the command transferring process and data transferring process can be constituted in a definite structure, and the logical structure within a device realizing the communications function can be designed concretely. In consequence, different processes, i.e., data transferring process and command transferring process can be easily performed by one communications means, so that a subdevice at the application side is equipped with a communications function convenient to use with uniformity.

Although the present invention has been fully described by way of example with reference to the accompanying drawings, various changes and modifications would be apparent to those skilled in the art. Such changes and modifications are to be understood as defined by the appended claims unless they depart therefrom.

What is claimed is:

1. A data communication system for sending combined data in a train of frames from a host device to a slave device through a bus structure, said slave device comprising a slave processor means and a slave memory means, said data communication system comprising:

a host processor means, operative under a read mode and a write mode, for producing a command data for use in said slave processor means and an address data for designating a memory area in said slave memory means, said command data being a read command data for commanding reading of data stored in the designated memory area in said slave memory means under said read mode, and said command data being a write command data for commanding writing of data stored in said designated memory area in said slave memory means under said write mode;

a hose memory means for storing read information obtained from said slave memory means under said read mode, and for storing write information which is to be written in said slave memory means under said write mode;

a host data transmission processing means, under said read mode, for receiving said read command data and said address data from said host processor means and for producing said train of frames such that said read command data and said address data are carried in a first frame, and, under said write mode, for receiving said write command data and said address data from said host processor means and said write information from said host memory means and for producing a train of frames such that said write command data and said address data are carried in a first frame and said write information in a following frame.

2. A data communication system as claimed in claim 1, further comprising:

a slave communication means for receiving said frames from said bus structure;

a means included in said slave data transmission processing means for unformatting said received frames into command data and address data; and a means included in said slave memory means for storing various data, said address data being used for accessing a particular area in said slave memory means.

3. A data communication system as claimed in claim 1, further comprising:

a slave communication means for receiving said frames from said bus structure;

a slave data transmission processing means for unformatting said received frames into address data and command data;

a means included in said slave memory means for storing said write data at a particular area corresponding to said address data.

4. A data communication system as claimed in claim 1, further comprising:

a slave processor means for producing a command data for use in a host processor means and an address data for designating a memory area in said host memory means;

a slave memory means for storing information data;

a slave data transmission processing means for relieving said command data and said address data from said slave processor means and reading said information data from said slave memory means, said data transmission processing means arranging said command data, address data and information data in a predetermined format comprising a train of frames; and a slave communication means for sending said frames to said bus structure.

5. A data communication system as claimed in claim 4, further comprising:

a host communication means for receiving said frames from said bus structure;

a means included in said host data transmission processing means for unformatting said received frames into command data and address data; and a means included in said host memory means for storing various data, said address data being used for accessing a particular area in said host memory means.

6. A data communication system as claimed in claim 5, wherein said host communication means receives said frames from said bus structure; said host data transmission processing means unformats said received frames into address data and command data; said host processor means reads said command data; and said host memory means stores said information data at a particular area corresponding to said address data.

* * * * *